(12) United States Patent
Houlihan et al.

(10) Patent No.: US 10,414,948 B2
(45) Date of Patent: Sep. 17, 2019

(54) CURE OF ANAEROBIC COMPOSITIONS

(71) Applicant: HENKEL IP & HOLDING GMBH, Duesseldorf (DE)

(72) Inventors: James Houlihan, Dublin (IE); Nigel Sweeney, Dublin (IE); Brian Deegan, Dublin (IE); Brendan Kneafsey, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/036,303

(22) Filed: Jul. 16, 2018

(65) Prior Publication Data

US 2018/0320027 A1   Nov. 8, 2018

Related U.S. Application Data

(63) Continuation of application No. PCT/EP2017/050606, filed on Jan. 12, 2017.

(30) Foreign Application Priority Data

Jan. 15, 2016 (GB) .................................. 1600811.2

(51) Int. Cl.
    *C09J 5/04* (2006.01)
    *C09J 133/12* (2006.01)

(52) U.S. Cl.
    CPC .............. *C09J 5/04* (2013.01); *C09J 133/12* (2013.01); *C09J 2400/20* (2013.01); *C09J 2409/006* (2013.01); *C09J 2423/006* (2013.01); *C09J 2425/006* (2013.01); *C09J 2433/00* (2013.01); *C09J 2469/006* (2013.01); *C09J 2477/006* (2013.01)

(58) Field of Classification Search
    CPC ........................................................ C09J 5/04
    See application file for complete search history.

(56) References Cited

U.S. PATENT DOCUMENTS

| 3,218,305 | A | 11/1965 | Krieble |
| 3,425,988 | A | 2/1969 | Gorman et al. |
| 4,180,640 | A | 12/1979 | Meoldy et al. |
| 4,287,330 | A | 9/1981 | Rich |
| 4,321,349 | A | 3/1982 | Rich |
| 4,442,138 | A * | 4/1984 | Bich .................. C09D 4/00 427/116 |
| 4,731,146 | A | 3/1988 | Clark |
| 5,605,999 | A | 2/1997 | Chu et al. |
| 2008/0242764 | A1 | 10/2008 | Wallace et al. |

FOREIGN PATENT DOCUMENTS

EP   0478220 A2   4/1992

OTHER PUBLICATIONS

Rich, Richard D. "Anaerobic Adhesives," Handbook of Adhesive Technology, ed. Pizza, A and Mittal, K.L., Marcel Dekker, Inc., Chapter 2, 1994, pp. 467-479.

* cited by examiner

*Primary Examiner* — Daniel H Lee
(74) *Attorney, Agent, or Firm* — Steven C. Bauman

(57) ABSTRACT

A bonding system for bonding a plastic substrate to another substrate, the bonding system comprising a plastic substrate wherein the plastic substrate is impregnated with a transition metal; and an anaerobically curable composition. Cure of the anaerobically curable composition is initiatable by the transition metal when the anaerobically curable composition is contacted with the plastic substrate under anaerobic conditions.

12 Claims, 1 Drawing Sheet

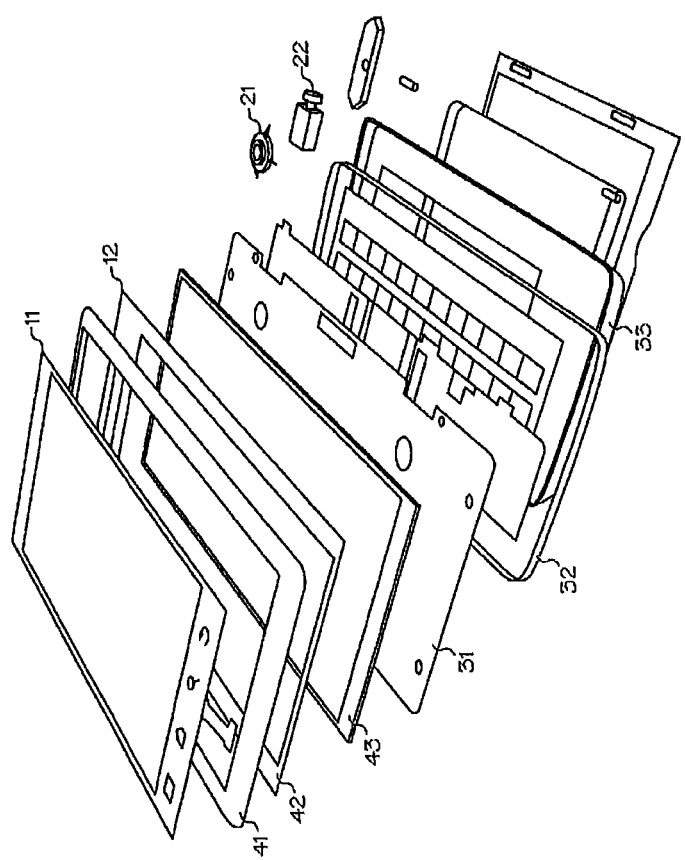

CURE OF ANAEROBIC COMPOSITIONS

FIELD OF THE INVENTION

The present invention relates to the cure of anaerobic compositions. Anaerobically curable compositions are well known. Typically anaerobically curable compositions remain uncured when exposed to air (oxygen). They typically cure under suitable anaerobic conditions.

For some applications, bonding using an anaerobic composition is troublesome. For example, some substrates are difficult to bond utilising anaerobically curable compositions. For such applications two-part compositions may be formulated. Formulating the compositions as two-part compositions allows a greater degree of freedom in selection of components. For example, it may be possible to place a cure initiator in one part of a two-part composition. When the two parts of the composition are brought together under suitable anaerobic conditions the composition cures.

It is also possible to use a primer for substrates that are difficult to bond utilising anaerobically curable compositions. Where two substrates are to be bonded together, primer may be applied to at least one of the substrates. So for example, when bonding two substrates together, where at least one of those substrates is a difficult to bond substrate, primer may be applied to either substrate, though desirably it is applied to the difficult to bond substrate.

DESCRIPTION OF RELATED ART

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid (EDTA) which are employed to sequester metal ions.

U.S. Pat. No. 4,442,138 describes a method of curing an anaerobic resin using specific transition metal beta keto ester complexes which are applied to the surface of a substrate.

It is desirable to provide alternative systems for bonding and methods of bonding utilising anaerobically curable compositions.

SUMMARY OF THE INVENTION

In one aspect, the present invention provides a bonding system for bonding a plastic substrate to another substrate, the bonding system comprising:
  a plastic substrate wherein the plastic substrate is impregnated with a transition metal; and
  an anaerobically curable composition,
wherein cure of the anaerobically curable composition is initiatable by the transition metal when the anaerobically curable composition is contacted with the plastic substrate under anaerobic conditions.

It will be appreciated that a plastics substrate cannot be impregnated by application of a material such as a liquid material to the substrate. Application of a material such as a liquid material to a plastics substrate results in a layer on the surface. A surface layer is not considered to be impregnation. Furthermore it will be appreciated that a plastics substrate cannot be impregnated by application of a liquid material whether or not an applied vacuum is utilised. Plastics substrates are not porous and use of a vacuum will not effect impregnation.

The transition metal may be present in the form of a salt.

In a bonding system of the invention the transition metal may be any transition metal selected from Groups 3 to 12 of the Periodic Table of Elements and combinations thereof. For example a salt of any transition metal selected from Groups 3 to 12 of the Periodic Table of Elements, and combinations of those salts, may be used.

In all cases however it will be appreciated that the transition metal is redox active. Being redox active allows it to participate in the activation of (anaerobic cure of) the anaerobic composition.

In a bonding system of the invention the plastic substrate may be impregnated with a transition metal, for example when the plastic is in molten form, such as during moulding of the plastic substrate.

The invention also relates to a method of bonding a plastic substrate to another substrate, the method comprising:
  providing a plastic substrate wherein the plastic substrate is impregnated with a transition metal; and
  providing an anaerobically curable composition; and
  initiating cure of the anaerobically curable composition by contacting the transition metal with the anaerobically curable composition by contacting the anaerobically curable composition with the plastic substrate under anaerobic conditions.

The transition metal may be titanium, chromium, manganese, iron, cobalt, nickel, copper, zinc, silver, vanadium, molybdenum, ruthenium, and combinations thereof.

The transition metal may be selected from copper, iron, vanadium, cobalt, chromium, silver and manganese and combinations thereof.

Desirably the transition metal may be copper, iron, vanadium, cobalt and chromium, and combinations thereof.

Desirably the transition metal is provided in the form of a salt.

Suitable salts include the following salts and any combination thereof.

Titanium salts include: titanium(IV) bromide; titanium carbonitride powder, $Ti_2CN$; titanium(II) chloride; titanium (III) chloride; titanium(IV) chloride; titanium(III) chloride-aluminum chloride; titanium(III) fluoride; titanium(IV) fluoride; titanium(IV) iodide; titanium(IV) oxysulfate solution Chromium salts include: chromium(II) chloride; chromium(III) bromide; chromium(III) chloride; chromium(III) chloride tetrahydrofuran complex; chromium(III) fluoride; chromium(III) nitrate; chromium(III) perchlorate; chromium(III) phosphate; chromium(III) sulfate; chromyl chloride; $CrO_2$; potassium chromium(III) oxalate;

Manganese salts include: manganese(II) bromide; manganese(II) carbonate; manganese(II) chloride; manganese (II) cyclohexanebutyrate; manganese(II) fluoride; manganese(III) fluoride; manganese(II) formate; manganese(II) iodide; manganese(II) molybdate; manganese(II) nitrate; manganese(II) perchlorate; manganese(II) sulfate.

Iron salts include: ammonium iron(II) sulfate; iron(II) bromide; iron(III) bromide; iron(II) chloride; iron(III) chloride; iron(III) citrate; iron(II) fluoride; iron(III) fluoride; iron(II) iodide; iron(II) molybdate; iron(III) nitrate; iron(II) oxalate; iron(III) oxalate; iron(II) perchlorate; iron(III) phosphate; iron(III) pyrophosphate; iron(II) sulfate; iron(III) sulfate; iron(II) tetrafluoroborate; potassium hexacyanoferrate(II).

Cobalt salts include: cobalt (II) naphthenate; Ammonium cobalt(II) sulfate; cobalt(II) benzoylacetonate; cobalt(II) bromide; cobalt(II) carbonate; cobalt(II) chloride; cobalt(II) cyanide; cobalt(II) fluoride; cobalt(III) fluoride; cobalt(II) hydroxide; cobalt(II) iodide; cobalt(II) nitrate; cobalt(II) oxalate; cobalt(II) perchlorate; cobalt(II) phosphate; cobalt (II) sulfate; cobalt(II) tetrafluoroborate; cobalt(II) thiocyanate; cobalt(II) thiocyanate; trans-dichlorobis(ethylenediamine)cobalt(III) chloride; Hexamminecobalt(III) chloride; pentaamminechlorocobalt(III) chloride.

Nickel salts include: ammonium nickel(II) sulfate; bis (ethylenediamine)nickel(II) chloride; nickel(II) acetate; nickel(II) bromide; nickel(II) bromide ethylene glycol dimethyl ether complex; nickel(II) bromide 2-methoxyethyl ether complex; nickel carbonate, nickel(II) carbonate hydroxide; nickel (II) chloride; nickel(II) cyclohexanebutyrate; nickel (II) fluoride; nickel (II) hexafluorosilicate; nickel(II) hydroxide; nickel(II) iodide; nickel (II) nitrate; nickel(II) oxalate; nickel(II) perchlorate; nickel(II) sulfamate; nickel(II) sulfate; potassium nickel(IV) paraperiodate; potassium tetracyanonickelate (II).

Copper salts include: copper acetate, copper hexanoate, copper-2-ethylhexanoate copper carbonate; copper (II) acetylacetonate; copper(I) bromide; copper(II) bromide; copper(I) bromide dimethyl sulfide complex; copper(I) chloride; copper(II) chloride; copper(I) cyanide; copper(II) cyclohexanebutyrate; copper(II) fluoride; copper(II) formate; copper(II) D-gluconate; copper(II) hydroxide; copper (II) hydroxide phosphate; copper(I) iodide; copper(II) molybdate; copper(II) nitrate; copper(II) perchlorate; copper (II) pyrophosphate; copper(II) selenite; copper(II) sulfate; copper(II) tartrate; copper(II) tetrafluoroborate; copper(I) thiocyanate; tetraamminecopper(II) sulfate.

Zinc salts include: zinc bromide; zinc chloride; zinc citrate; zinc cyanide; zinc fluoride; zinc hexafluorosilicate; zinc iodide; zinc methacrylate; zinc molybdate; zinc nitrate; zinc oxalate; zinc perchlorate; zinc phosphate; zinc selenite; zinc sulfate; zinc tetrafluoroborate; zinc p-toluenesulfonate.

Silver salts include: silver bromate; silver carbonate; silver chlorate; silver chloride; silver chromate; silver citrate; silver cyanate; silver cyanide; silver cyclohexanebutyrate; silver(I) fluoride; silver(II) fluoride; silver heptafluorobutyrate; silver hexafluoroantimonate; silver hexafluoroarsenate(V); silver hexafluorophosphate; silver(I) hydrogenfluoride; silver iodide; silver lactate; silver metavanadate; silver molybdate; silver nitrate; silver nitrite; silver pentafluoropropionate; silver perchlorate; silver(I) perrhenate; silver phosphate; silver(I) sulfadiazine; silver sulfate; silver tetrafluoroborate; silver thiocyanate; silver p-toluenesulfonate.

Vanadium salts include: vanadium (III) acetylacetonate; vanadium(II) chloride; vanadium(III) chloride; vanadium (IV) chloride; vanadium(III) chloride tetrahydrofuran complex; vanadium(V) oxychloride; vanadium(V) oxyfluoride.

Molybdenum salts include: Molybdenum(III) chloride; Molybdenum(V) chloride; Molybdenum(VI) dichloride dioxide.

Ruthenium salts include: chloropentaammineruthenium (II) chloride; hexaammineruthenium(II) chloride; hexaammineruthenium(III) chloride; pentaamminechlororuthenium (III) chloride; ruthenium(III) chloride; ruthenium iodide; ruthenium(III) nitrosyl chloride; ruthenium(III) nitrosyl nitrate.

The transition metal salt may be selected from cobalt (II) naphthenate; copper carbonate; copper (II) acetylacetonate; silver nitrate; vanadium (III) acetylacetonate and combinations thereof.

It will be appreciated that a huge range of plastics may be bonded utilising the present invention. Indeed bonding may be achieved with plastics other than polyolefins. Plastics which can be bonded using the present invention include PCABS (Polycarbonate/Acrylonitrile Butadiene Styrene); polycarbonate; polyarylamides; polyamides, acrylic plastics, said plastics being optionally transparent plastics so that the substrate is transparent, for example the plastics may be those used as a glass substitute, (such as that based on acrylic plastics and known as Perspex®;) and/or said plastics being optionally reinforced for example with fibres such as glass fibres.

The invention is of particular use when both substrates are plastic. For example, the results below show that where one would expect little or no bonding/cure to take place, utilising the system of the present invention shows a dramatic improvement in bond strength, for example tensile strength, including tensile shear strength when both substrates are plastic.

It will be appreciated that the compositions of the invention may be used in the assembly of devices comprising plastic parts which are to be bonded together during assembly. In such an instance at least one of the plastic parts is impregnated with a transition metal. For example this system of the invention may be used for electronic devices such as handheld electronic devices.

It will be appreciated that the present invention is particularly useful with one part anaerobically curable compositions. Accordingly, good bonding can be achieved using a one part composition.

Furthermore, it will be appreciated that the present invention does not require the use of a primer. The present invention can be utilised without a primer.

In particular, the present invention can achieve bonding between two plastic substrates where at least one of them, and desirably both, have been impregnated with a transition metal. It can do so utilising a one part composition. And it can do so without a primer being used.

The anaerobically curable comprises an anaerobically curable component which undergoes anaerobic cure, and a curing component which cures the anaerobically curable component.

An anaerobically curable component will typically be present in an amount of from about 50% to about 99% by weight of the total composition, for example from about 55% to about 95%.

A curing component within the anaerobically curable composition may be present in an amount of from about 0.1 to about 10%, such as from about 1 to about 5%, for example about 5% by weight based on the total weight of the composition.

Desirably the anaerobically curable component includes a rubber component such as a natural or synthetic rubber/elastomeric component. This component may be present in an amount of from about 5 to about 35%, such as from about 10 to about 35%, for example about 15 to about 30% by weight based on the total weight of the composition.

The transition metal (in whatever form it is used, for example salt form,) may be present in an amount up to about 1% by weight of the composition that forms the plastic component. Even at such relatively low loading activation of anaerobic compositions for cure thereof can occur. For example it may be present in an amount from about 0.01% to about 1% by weight of the composition that forms the plastic component.

Anaerobic curable compositions may have an anaerobically curable component based on a suitable (meth)acrylate component.

One or more suitable (meth)acrylate components may be selected from among those that are a (meth)acrylate having the formula:

where G may be hydrogen, halogen or alkyl groups having from 1 to about 4 carbon atoms, and R⁸ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

One or more suitable (meth)acrylates may be chosen from among polyfunctional (meth)acrylates, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example the anaerobically curable component may include Bisphenol A dimethacrylate:

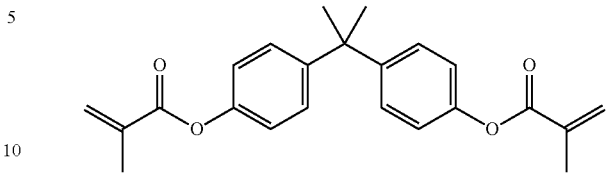

Still other (meth)acrylates that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable materials may be chosen from polyacrylate esters represented by the formula:

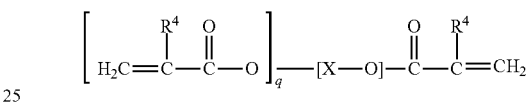

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

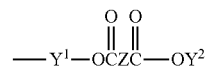

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other materials may be chosen from the reaction products of di- or tri-alkylolamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

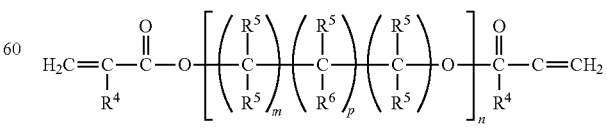

where $R^5$ represents a radical selected from hydrogen, alkyl of from 1 to about 4 carbon atoms, hydroxy alkyl of from 1 to about 4 carbon atoms, or

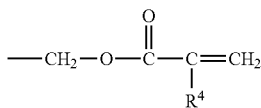

where $R^4$ is a radical selected from hydrogen, halogen, or alkyl of from 1 to about 4 carbon atoms; $R^6$ is a radical selected from hydrogen, hydroxyl, or

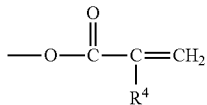

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula

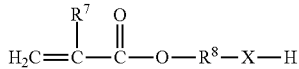

where X is selected from —O— and

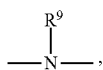

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

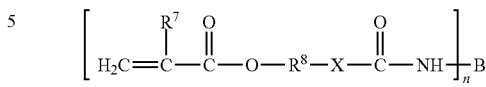

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Other unsaturated reactive monomers and oligomers such as styrenes, maleimides, vinyl ethers, allyls, allyl ethers and those mentioned in U.S. Pat. No. 6,844,080B1 (Kneafsey et al.) can be used. Vinyl resins as mentioned in U.S. Pat. No. 6,433,091 (Xia) can also be used. Methacrylate or acrylate monomers containing these unsaturated reactive groups can also be used.

Of course, combinations of these (meth)acrylates and other monomers may also be used.

Desirably the anaerobically curable component comprises at least one acrylate or methacrylate ester group.

Desirably the anaerobically curable component comprises is chosen from at least one of epoxy (meth)acrylates, urethane (meth)acrylates, urethane di(meth)acrylates, alkyl (meth)acrylates, stearyl (meth)acrylates, isocyanurate (meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

The anaerobic compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions used in the present invention may further comprise thickeners and/or fillers.

As mentioned above it will be appreciated that the composition used in the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, PTFE, mica, polyamide wax, titanium dioxide, barium sulphate.

The present invention also provides methods of bonding using the anaerobic adhesive compositions, as well as the reaction products of the compositions.

The anaerobically curable compositions for use in the present invention may be prepared using conventional methods which are well known to those persons of skill in the art. For instance, the components of the composition may be mixed together in any convenient order consistent with the roles and functions the components are to perform in the compositions. Conventional mixing techniques using known apparatus may be employed.

BRIEF DESCRIPTION OF THE DRAWINGS

Embodiments of the invention will be described, by way of example only, with reference to the accompanying drawings in which:

FIG. 1 depicts an exploded view of various component layers of a hand held consumer electronic display device, and in which the bonding system of the invention may be used to bond a plastic part to one or more other parts.

DETAILED DESCRIPTION

An example of one or more articles that may be formed using a bonding system of the invention may be seen with reference to FIG. 1. There, several articles that are used in the assembly of hand held consumer electronic devices are highlighted as benefiting from the bonding system of the invention. Articles that may be bonded with the bonding system of the invention: include: 1. touch panel window 11 and cover 12; 2. speaker 21 and camera lens 22; 3. cover 31, metal trim 32 and subframe 33; and 4. touch panel 41, plastic bezel 42 and metal trim 43. In accordance with the present invention at least one plastic part to be bonded to another part is impregnated with a transition metal and an anaerobically curable composition activated by the transition metal is used to bond the parts together. It will be appreciated in all aspects of the invention that suitable anaerobic conditions may be achieved when parts to be bonded are brought together in a way that creates the anaerobic conditions, for example when the anaerobic composition is sufficiently isolated from ambient air (oxygen) by the bringing of the parts to be bonded together.

Experimental

The following experimental work was carried out to exemplify the present invention. It demonstrates the impregnation of plastic substrates with transition metals to facilitate bonding with an anaerobic adhesive.

The following anaerobic adhesive was prepared (all amounts are ±10%):

TABLE 1

| Component | Amount (% weight based on the total weight of the composition) |
| --- | --- |
| Methyl Methacrylate | 57.62 |
| Methacrylate functional polybutadiene rubber (Hypro VTBX LC 2000 Liquid Rubber) | 15.54 |
| Linear copolymer of styrene and polybutadiene (Kraton D1155) | 11.89 |
| Methacrylic acid | 4.57 |
| Polyethylene glycol 200 dimethacrylate | 0.171 |
| 1,4 Naphthoquinone | 0.009 |
| Propanediol 1,2 | 0.669 |
| Deionised water | 0.209 |
| EDTA tetrasodium salt $4H_2O$ | 0.032 |
| Acetyl Phenylhydrazine | 0.14 |
| Saccharin | 1.83 |
| Cumene Hydroperoxide | 1.83 |
| Hydrophobic silica | 5.49 |

As a control experiment standard off the shelf PCABS lapshears were bonded with the anaerobic adhesive set out above in Table 1 under anaerobic conditions under the following curing conditions –20 minutes at 80° C. followed by 24 h at room temperature. Low bond strengths were achieved and the bonds were easily pulled apart by hand.

In the following tests all bonding was carried out using the composition in Table 1 above.

Pin to Lapshear Tests 700 ppm of copper(II)-acetylacetonate 97% powder was added to pellets of PCABS. The pellets were then moulded into pins for bonding with the adhesive of Table 1. The plastic discolours slightly when moulded.

The pins were bonded to lapshears as set out in Table 2 below following standard test method DIN EN 15870 for 20 minutes at 80° C. followed by 24 h at room temperature and then tested for tensile strength. (So two substrates are bonded together for tensile bond strength testing—the pin and the lapshears.)

TABLE 2

| Pin to lapshear bonding | | |
| --- | --- | --- |
| Pin used | Lapshear used | Tensile strength |
| PCABS copper added to pin | standard anodised aluminium lapshear | 3.39 ± 1.75 MPa |
| PCABS copper added to pin | standard PCABS lapshear | 4.22 ± 0.48 MPa |
| PCABS No copper added to pin | standard anodised Al | *5.39 ± 2.1 MPa |
| PCABS No copper added to pin | standard PCABS lapshear | **No Cure |
| PCABS No copper added to pin | PCABS lapshear no copper added | **No Cure |

*Control using one Aluminium substrate - good bond strength expected as industrial grades of aluminium contain amounts of copper which facilitate anaerobic cure.
**Control where both substrates are plastic Tensile Shear test Lapshears 700 ppm of copper(II)-acetylacetonate 97% powder was added to pellets of PCABS. The pellets were then moulded into lap shears for bonding with the adhesive of Table 3. The plastic discolours slightly when moulded.

Lapshears were bonded to lapshears as set out in Table 3 below following standard test ISO 4587 for 20 minutes at 80° C. followed by 24 h at room temperature and then tested for tensile shear strength. (So two substrates are bonded together for tensile shear strength testing—first and second lapshears.)

TABLE 3

| Lapshears Used | Tensile Shear strength |
| --- | --- |
| PCABS standard lapshears - PCABS standard lapshears | No cure |
| PCABS no copper added lapshears - standard anodised aluminium lapshears | 4.19 ± 0.31 MPa |
| PCABS copper added lapshears - PCABS copper added lapshears | >5 Mpa - SF |
| PCABS copper added lapshears - standard anodised aluminium lapshears | 3.93 ± .49 MPa - SF |

All lapshears were moulded in house except where indicated as standard.

"SF" indicates substrate failure i.e. the substrate failed before the bond shear strength was reached.

The results above demonstrate that including a transition metal component within a plastics substrate, for example during moulding thereof, results in much better bonding with an anaerobically curable adhesive.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A bonding system for bonding a plastic substrate to another substrate, the bonding system comprising:
    (a) a plastic substrate wherein the plastic substrate is impregnated with a transition metal; and
    (b) an anaerobically curable composition,
    wherein cure of the anaerobically curable composition is initiatable by the transition metal when the anaerobically curable composition is contacted with the plastic substrate under anaerobic conditions.

2. A bonding system according to claim 1 wherein the transition metal is present in the form of a salt.

3. A bonding system according to claim 1 wherein the transition metal is selected from the group consisting of copper, iron, vanadium, cobalt, chromium, silver, manganese, and combinations thereof.

4. A bonding system according to claim 1 wherein the transition metal is in salt form and is selected from the group consisting of: cobalt (II) naphthenate; copper carbonate; copper (II) acetylacetonate; silver nitrate; vanadium (III) acetylacetonate and combinations thereof.

5. A bonding system according to claim 1 wherein the plastic substrate is impregnated with a transition metal when the plastic is in molten form.

6. A bonding system according to claim 1 wherein the plastic substrate is PCABS (Polycarbonate/Acrylonitrile Butadiene Styrene); polycarbonate; polyarylamides; polyamides, acrylic plastics, said substrate being optionally transparent and/or being optionally reinforced with fibres.

7. A bonding system according to claim 1 wherein the anaerobically curable component is present in an amount of from 50% to 99% by weight of the total composition.

8. A bonding system according to claim 1 wherein a curing component within the anaerobically curable composition is present in an amount of from 0.1 to 10% by weight based on the total weight of the composition.

9. A bonding system according to claim 1 wherein the anaerobically curable composition includes a rubber component, which is optionally present in an amount of from 5 to 35% based on the total weight of the composition.

10. A bonding system according to claim 1 wherein the transition metal is present in an amount up to about 1% by weight of the composition that forms the plastic component.

11. A bonding system according to claim 1 wherein the anaerobic composition is a one-part composition.

12. A method of bonding a plastic substrate to another substrate, the method comprising:
    (a) providing a plastic substrate wherein the plastic substrate is impregnated with a transition metal; and
    (b) providing an anaerobically curable composition; and
    (c) initiating cure of the anaerobically curable composition by contacting the transition metal with the anaerobically curable composition by contacting the anaerobically curable composition with the plastic substrate under anaerobic conditions.

* * * * *